United States Patent [19]
Klaue

[11] 3,734,242
[45] May 22, 1973

[54] ANNULAR, ANTIPODAL, RELATIVELY-SEPARABLE BRAKE

[76] Inventor: Hermann Klaue, Tour D'Ivoire 24e, Montreux, Switzerland

[22] Filed: Apr. 15, 1971

[21] Appl. No.: 134,270

[30] Foreign Application Priority Data

| Apr. 18, 1970 | Germany | P 20 18 728.4 |
| July 28, 1970 | Germany | P 20 37 273.0 |
| Sept. 7, 1970 | Germany | P 20 44 241.5 |
| Sept. 7, 1970 | Germany | P 20 44 240.4 |
| Oct. 8, 1970 | Germany | P 20 49 459.1 |

[52] U.S. Cl. ............ 188/71.4, 188/72.7, 188/106 F, 192/70
[51] Int. Cl. .............................................. F16d 55/04
[58] Field of Search ................... 188/71.3, 71.4, 72.7, 188/106 A, 106 F; 192/70

[56] References Cited

UNITED STATES PATENTS

| 2,650,796 | 9/1953 | Abraham | 188/71.4 X |
| 3,583,529 | 6/1971 | Robinson | 188/71.4 |
| 3,435,920 | 4/1969 | Klaue | 188/71.3 |
| 2,732,036 | 1/1956 | Myers | 188/71.4 |
| 2,387,039 | 10/1945 | Parrett | 188/71.4 |

*Primary Examiner*—George E. A. Halvosa
*Attorney*—Stevens, Davis, Miller & Mosher

[57] ABSTRACT

A brake assembly comprising brake plates, each having a brake lining of friction material at least on one side thereof, and each adapted for mounting on a shaft or axle to be braked so as to be rotatable jointly with said shaft or axle and movable towards or away from one another, brake operating rings disposed between the brake plates and mounted so as to be movable towards or away from one another and a ball or roller and ramp mechanism disposed between the brake rings said mechanism being operable to cause movement of the brake rings in directions opposite to one another so that each brake ring contacts an adjacent brake plate and moves the same in a direction towards an adjacent stationary member and bring the brake lining of each said brake plate into contact with a braking surface of the stationary member to effect a brake operation.

9 Claims, 15 Drawing Figures

Patented May 22, 1973 3,734,242

ANNULAR, ANTIPODAL, RELATIVELY-SEPARABLE BRAKE

This invention relates to brakes comprising oppositely disposed stationary members spaced apart to provide a space therebetween the inner side of each said stationary member providing a braking surface, brake plates within the said space mounted on so as to be rotatable with for example the axle of a wheel assembly and axially slidable thereon, friction linings on at least the side of each brake plate facing the braking surfaces of the stationary members and operating means disposed between the brake plates said operating means being operable by brake actuating means to effect axial movement of the brake plates in a direction opposite to one another to bring the friction linings carried thereby into contact with the braking surfaces of the stationary members to effect braking.

Brakes of the kind above referred to used for example in tractors or heavy duty vehicles, have already been proposed in which the brake assembly is disposed within an axle housing opposite internal faces of the housing providing the stationary members. It has also been proposed in such particular brakes to provide brake operating means comprising two rings each referred to as a brake ring, between the brake plates. The brake rings are mounted side by side and have a ball or roller and ramp mechanism therebetween, the brake rings being mounted circumferentially so as to be capable of angular displacement relative to one another by operation of brake actuating means, the brake rings also being capable of axial movement towards or away from one another upon operation of the ball or roller and ramp mechanism as a result of the relative angular displacement.

The large braking surface and therefore the small specific friction surface dissipation and small dimensions are advantageous features of a brake of this construction. The self-servo effect with its pronounced dependence on fluctuations of the frictional coefficient due to the mounting of the braking rings which are free angularly displaceable in the circumferential direction and the provision of the ball or roller and ramp mechanism directly associated therewith is a disadvantage. The relatively poor operating efficiency of the brake is also a disadvantage since the frictional self-servo effect requires a large angle ($>35°$) of the ramps in order to ensure operation which in turn requires a large operating torque which must be applied to the braking rings. The aforementioned operating torque is absorbed in one direction of rotation and in the circumferential direction on a torsion bar support and thus increases the axial friction in the torsion bar drive. It is a further disadvantage of this kind of brake construction that when changing the direction of rotation during a braking operation and because of the unavoidable clearance of the braking rings on their mountings in the axle housing, said clearance increasing still further due to wear of the brake linings, it is necessary for such clearance to be overcome, an operation accompanied, as shown by experience, by a knocking noise.

It is the object of the present invention to provide improvements generally in a brake construction of the kind above referred to whereby the aforementioned disadvantages are eliminated, the thermal advantages of such prior construction are retained no increase in the technical effort for the construction of the brake being required.

A brake assembly according to the invention comprises brake plates each having linings of friction material at least on one side thereof said brake plates being adapted for mounting side by side on a shaft or axle to be braked and so as to be rotatable jointly with said shaft or axle and slidable axially thereof, towards and away from two stationary members each providing a braking surface parallel to the plane of the plates and disposed one on either side of the brake plates, brake plate operating means disposed between the brake plates and comprising two brake rings arranged side by side and a ball or roller and ramp mechanism disposed between the two brake rings said mechanism comprising two operating rings arranged side by side the opposite faces of the operating rings each having complementary ramps circumferentially spaced therearound and rolling elements between the operating rings for co-operation with the ramps, the brake rings being mounted so as to be movable axially towards or away from one another but fixed against circumferential movement the operating rings being mounted so as to be movable axially towards or away from one another and also capable of angular movement relative to one another by operation of brake actuating means said relative angular movement as a result of operation of the brake actuating means to effect braking, resulting in axial movement of the operating rings in opposite directions by the rolling elements and ramps each operating ring during such movement contacting an adjacent brake ring, each operating ring and the corresponding brake ring moving jointly in the same direction to cause each said brake ring to engage an adjacent brake plate and move the same into contact with the appropriate stationary braking surface to effect braking.

Advantageously the rolling elements of the rolling element and ramp mechanism are either balls or rollers. Further the bearings for the operating rings are advantageously ball bearings, the bearings being arranged so that they are disposed radially inwards of the rolling elements of the ball or roller and ramps, the clamping forces in the brake arising during a braking operation being transmitted through said bearings.

The relative angular displacement between the operating rings can be produced by effecting angular movement of both rings in opposite directions. Alternatively only one operating ring can be angularly displaceable, the other operating ring being secured against angular displacement.

A brake of the present invention is particularly suitable for use in the braking system of a tractor or heavy goods vehicle. In such applications and wherein a wheel axle extends through an axle housing the brake mechanism can be disposed in the housing oppositely disposed internal faces of the housing providing the stationary members.

The brake actuating means can be operated mechanically, by fluid pressure or electrically or by any combination of such means. For example one operating ring can be angularly displaced by mechanically operated means the other being angularly displaced by fluid pressure operated means.

According to a further feature, in brake of the invention means are provided for supporting the operating torque of the operating rings, the operating torque arising in one operating ring being transmitted through the other operating ring to stop means and vice-versa.

Means can also be provided in a brake of the invention for adjusting the brake to compensate for wear. Such means can comprise manually adjustable means or can comprise means operable automatically to effect adjustment.

According to another feature, means are provided for assisting in the support of the axially movable components of the brake against the torsional forces created therein by the drag forces arising during a braking operation. For example straps can be arranged around each brake ring, the straps extending substantially circumferentially of the brake rings one end of each strap being anchored to the brake ring, the opposite end being coupled to a fixed anchorage the straps being flexible to permit the axial movement of the brake rings. The straps can be arranged so that they are operative in the principal operating direction of rotation abutments on each brake ring for example radial projections, being engageable with further abutments, for example stop lugs on stationary parts of the brake cooperating in the opposite direction of rotation, appropriate working clearance being provided between the abutments in order to utilize the advantages of strap mounting in the principal direction of rotation.

Embodiments of the invention will now be described by way of example with reference to the accompanying drawings in which:

FIG. 14 is a section on the line E–F in FIG. 13, and FIG. 15 is a section on the line G–H in FIG. 13.

Figure 1:
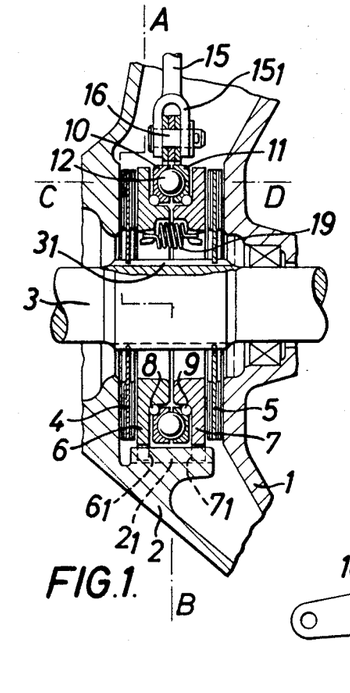
FIG. 1 is a view in section of a brake according to one embodiment of the invention.
Figure 2:
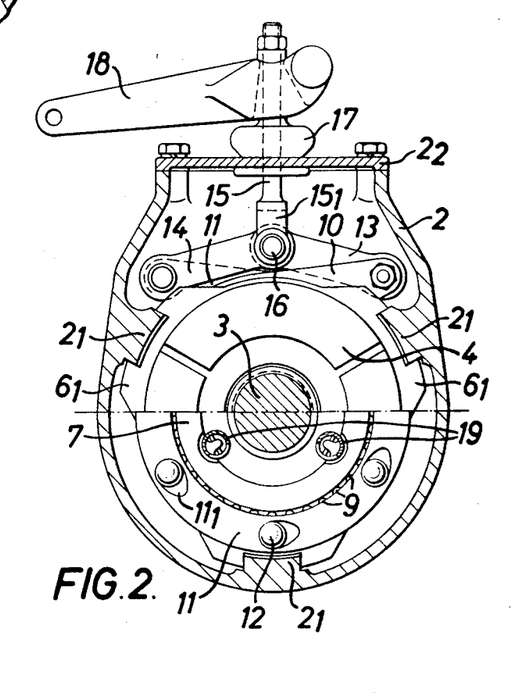
FIG. 2 is a section on the line A–B in FIG. 1.
Figure 3:
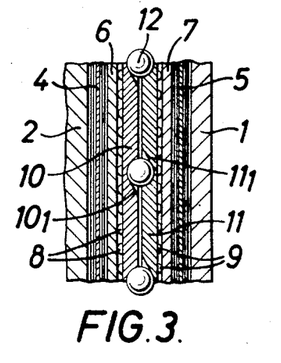
FIG. 3 is a fragmentary view in section of the brake operating means.

The brake shown in FIGS. 1, 2 and 3 of the drawings is provided for the braking of an axle 3 which passes through an axle housing the brake mechanism being disposed in the interior of the housing between the housing walls 1 and 2 each of which provides a stationary member and has formed on its inner face an annular braking surface concentric with the axle 3. Two annular brake plates 4 and 5 respectively are mounted on the axle 3, each said brake plate having a brake lining of friction material on each side thereof. The axle 3 has splines $3_1$ engaged by corresponding splines on the brake plates 4 and 5 so that each brake plate is rotatable jointly with the axle 3 and also capable of sliding movement lengthwise thereof towards and away from one another.

Disposed between the brake plates is a brake operating means which includes a ball and ramp mechanism. The brake operating means consists of two brake rings 6 and 7 respectively each of L section the said rings being interconnected with one another by a plurality of pull-off springs 19 arranged circumferentially in spaced relationship the spring urging the brake rings towards one another. Each brake ring 6, 7 has a radial projection $6_1$, $7_1$ respectively the said projections engaging with an abutment provided by a lug $2_1$ formed integral with the wall 2 of the housing the lug extending parallel to the axle 3. The brake rings 6 and 7 are thus capable of movement towards or away from one another but restrained against circumferential movement. The L section brake rings are arranged with their stepped sides facing one another thus providing an annular groove therebetween in which the ball and ramp mechanism is accommodated. This mechanism consists of two operating rings 10 and 11 arranged side by side. The surfaces of the operating rings facing one another are provided with complementary ramps $10_1$, $11_1$ respectively a ball 12 being accommodated in each oppositely disposed pair of ramps. Each operating ring 10, 11 is rotatably supported on ball bearings 8, 9 respectively the ball tracks being provided on respectively each operating ring 10, 11 and each brake ring 6, 7. The ball bearings 8, 9 are disposed radially inwards of the balls 12 of the ball and ramp mechanism.

The operating rings 10 and 11 are angularly displaceable relative to one another through a toggle linkage, one link 13 of which is pivotally connected by one end to the operating ring 11, the other link 14 being pivotally connected about one end to the operating ring 12. The opposite ends of the two links 13, 14 are pivotally connected to a common pivot pin 16 carried by the clevis $15_1$ of a pull rod 15 which is slidably mounted in a removable cover $2_2$ of the axle housing. The aperture in the cover through which the pull rod 15 extends is closed by a sealing boot 17 to prevent the ingress of dirt and other foreign matter to the brake mechanism. The end of the pull rod extending outwardly from the cover $2_2$ is coupled to one end of an arm 18, the other end of the arm being connectable to the linkage of brake actuating mechanism on for example a vehicle in which the brake is installed.

The brake is shown in the brake off or released position. When the brake linkage is actuated to effect a braking operation, the arm 18 turns in the clockwise direction (FIG. 3) thus sliding the pull rod in a direction outwardly of the axle housing. As a result, the angle between the links 13 and 14 is reduced and the operating rings 10, 11 angularly displaced rotationally in opposite directions. This in turn causes movement of the operating rings away from one another by the action of the balls and ramps the corresponding movement being imparted to the brake rings 6 and 7 through the bearings 8 and 9. The sliding movement of the brake rings brings each said ring into contact with the adjacent brake plate, each said brake plate thus moving in a direction towards the adjacent stationary braking surface of the axle housing whereby a braking operation is effected. Upon release of the vehicle braking mechanism the pull-off springs operate to release the brake.

Figures 4, 5, 6:
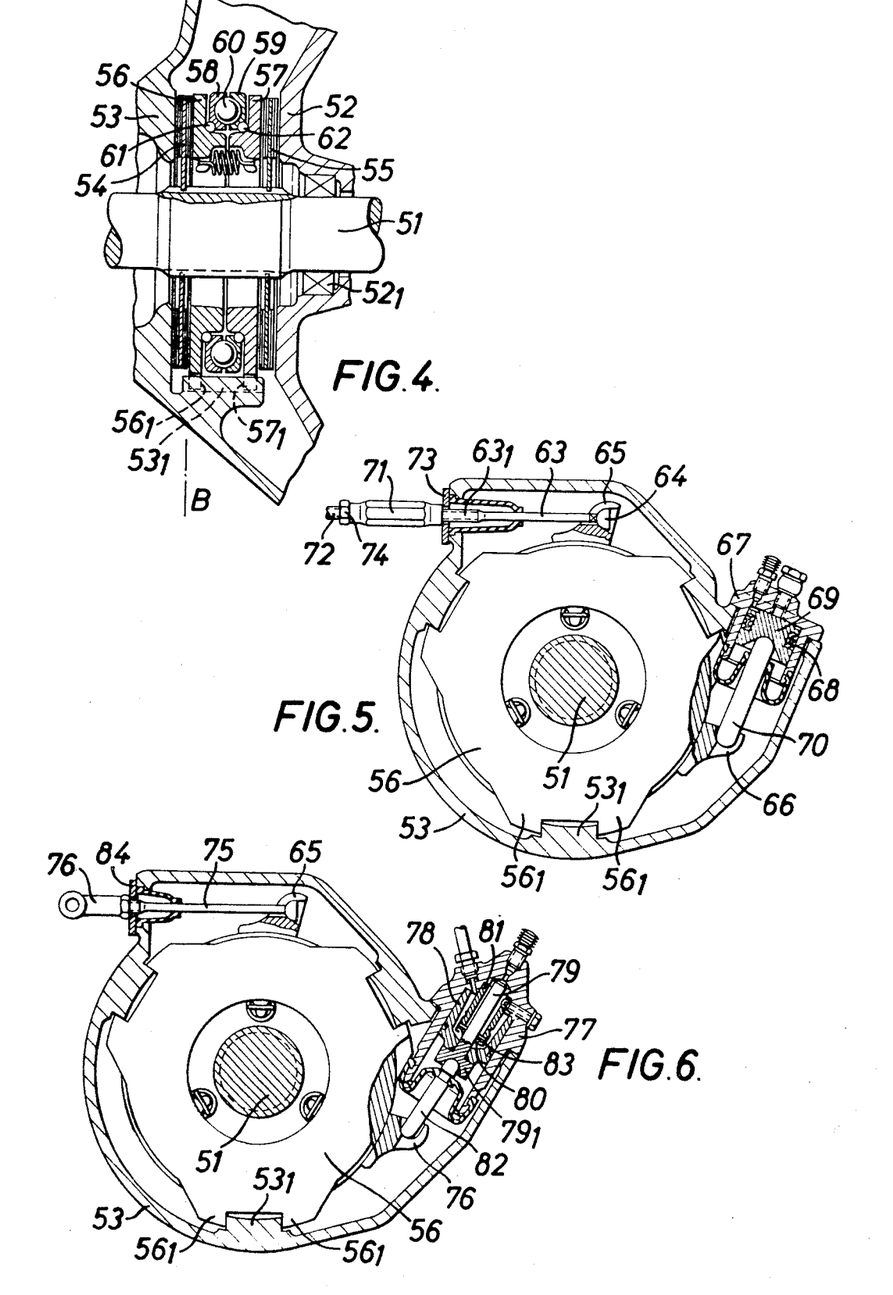
FIG. 4 is a view in section of a brake according to a second embodiment.
FIG. 5 is a section on the line A–B in FIG. 4.
FIG. 6 is a view in section showing a modification of the brake construction of FIGS. 4 and 5.

The mechanism of the brake shown in FIGS. 4 and 5 of the drawings is also disposed in an axle housing and between opposite walls 52, 53 thereof each of said walls forming a stationary member, the inner surface of each said wall being formed to provide an annular braking surface. An axle 51 extends through the axle housing an oil seal $52_1$ being provided around one end of the axle. The brake mechanism includes two annular brake plates 54, 55 each of which has linings of friction material on opposite sides thereof the axle having splines engageable with splines on each brake plate so that the latter rotate jointly with the axle and are also slidable towards and away from one another. Disposed between the two brake plates are two brake rings 56, 57 each of L section the brake rings being arranged with their stepped sides facing one another. The brake rings 56, 57 are mounted so as to be movable towards or away from one another but are held against circumferential movement by engagement of radial projections $56_1$ and $57_1$ respectively with abutments formed by lugs $53_1$ formed integral with the housing wall 53, the lugs extending parallel to the axle 51. The stepped sides of the brake rings form together an annular space in which is disposed two operating rings 58, 59 respectively. The sides of the operating rings facing one another are each provided with a plurality of circumferentially spaced ramps opposite pairs of ramps having a ball 60 disposed therebetween. The operating rings are each rotatably supported on bearings each of which consists of a ring of balls 61, 62 respectively the balls being disposed around tracks formed on each operating ring and its associated brake ring. The ball and ramp mechanism of this embodiment is identical in construction to that described in connection with FIG. 1.

In the present embodiment the relative angular displacement of the operating rings 58, 59 to effect a braking operation is effected by separate means independent of one another, the operating ring 58 being actuated by mechanically operated means and the operating ring 59 by fluid pressure operated means. Operating ring 58 has an outwardly projecting lug 65 having a recess which forms a seating for the half ball end 64 of a pull rod 63 which extends substantially tangential to the ring and outwardly of the axle housing through an aperture in the wall thereof. A sealing boot prevents the ingress of dirt and foreign matter through the aperture. The outwardly projecting end of the pull rod 63 is screw threaded and has a sleeve 71 screwed thereon the bore of the sleeve having threads of opposite hand one of which receives the pull rod 63 the other having the threaded end of a brake rod 72 screwed thereto and forming part of the vehicle brake linkage. The sleeve 71 and brake rod 72 are secured by a locknut 74. A washer 73 is provided at the outer end of the aperture in the axle housing and provides a stop abutment engageable by the adjacent end of the sleeve to limit the movement of the pull rod inwardly of the housing and the angular displacement of the operating ring 58 in the clockwise direction (FIG. 5). A pull on the brake rod 72 will result in angular displacement of the operating ring 58 in the anti-clockwise direction (FIG. 5).

The fluid pressure means for operating ring 59 comprises a cylinder 67 supported in the axle housing. The cylinder 67 has a piston 69 slidable therein the piston being sealed by a cap seal 68. The outer face of the piston has a recess with a hemispherical surface which provides a seating for one end of a tappet 70 the other end of which engages in a recess in a lug 66 projecting outwardly from operating ring 59. The inner end face of the cylinder provides a stop abutment for the piston thus limiting the angular displacement of operating ring 59 in the anti-clockwise direction (FIG 5). The admission of pressure fluid to the cylinder 67 causes outward movement of the piston 69 and angular displacement of the operating ring 59 in the clockwise direction (FIG. 5) through the tapped 70. Thus by effecting simultaneously the operation of the pull rod 63 and the piston 69 the operating rings are angularly displaced in opposite directions the brake being applied as a result of the operation of the balls 60 and ramps. Pull-off springs interconnecting the brake rings 56, 57 are provided as in the previously described embodiment.

The sleeve 71 provides a brake adjuster which is manually operable to effect brake adjustment when required. By slacking off the locknut 74 the sleeve 71 can be rotated in one direction or the other to vary the effective length of the brake rod 72 and pull rod 63 whereby the operating ring 58 will be angularly displaced in one direction or the other. As the operating rings 58 and 59 are freely angularly displaceable on their supporting bearings the reaction force created during adjustment will be transmitted through operating ring 59 and taken by the inner surface of the cylinder 67. Thus it is unnecessary for any separate adjustment of the operating ring 59 to be made.

FIG. 6 shows a modification of the construction shown in FIG. 5. In this modification means are incorporated in the fluid pressure cylinder operable to effect automatic adjustment of the brake to compensate for wear in for example the friction linings.

In this embodiment shown in in FIG. 6, the pull rod 75 is coupled directly to the clevis head 76 to which the linkage, not shown, of the vehicle braking linkage can be connected. A washer 84 serves as a stop abutment. The fluid pressure cylinder 77 is provided with a hollow piston 78, adapted to support a rod 79 extending through the piston. The rod bears via an expander ring 80 on a sleeve 81 which surrounds the rod and is fixedly joined to the cylinder 77. On its end extending from the piston, the rod 79 is provided with a ball cup $79_1$ in which the tappet 82 bears, said tappet providing the connection to the lug 76 of the operating ring 59. The sleeve 31 is provided with a sheet metal cap 83 in which the expanding ring 80 is retained with axial clearance. If the permissible clearance of the brake is exceeded, the expanding ring 80 will bear on the cap after overcoming the clearance, the rod 79 together with the piston 78 may traverse for a defined distance through the expanding ring and, on the return motion, that is to say when the brake is released, is retained in this position by bearing against the sleeve 81. This enables the clearance of the brake to be adjusted without the need for separate adjustment of the mechanical actuating system. Both actuating systems automatically retain the same actuating clearance.

Figure 7:
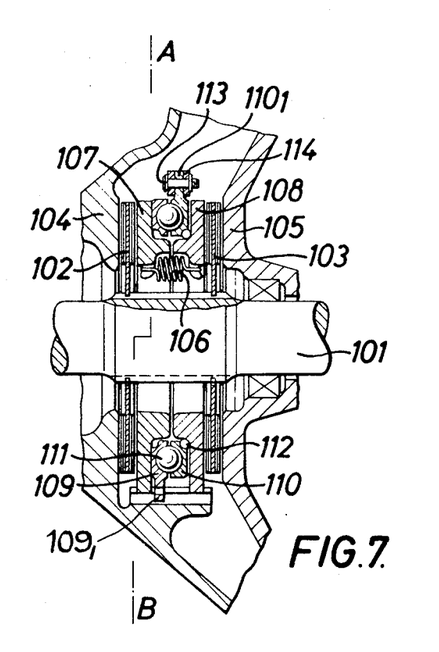
FIG. 7 is a view in section of a brake according to a third embodiment.
Figure 8:
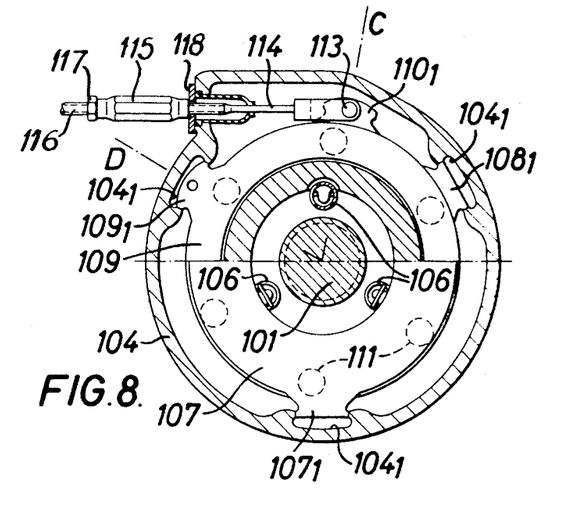
FIG. 8 is a view on the line A–B in FIG. 7.

In the embodiment shown in FIGS. 7 and 8 of the drawings the construction of the brake mechanism is generally identical to that disclosed in FIGS. 1 and 4 of the drawings the brake mechanism being disposed in the interior of an axle housing having oppositely disposed walls 104 and 105 the interior faces of which are each formed to provide stationary annular braking surfaces. An axle 101 passes through the axle housing and has splines engageable with internal splines on the two annular brake plates 102, 103 which are thus jointly rotatable with the axle and capable of sliding movement towards and away from one another each brake plate having annular brake linings of friction material on opposite sides.

Disposed between the brake plates are two L section brake rings 107, 108 arranged with their stepped sides facing one another the brake rings being mounted so as also to be movable towards or away from one another but held against circumferential movement by engagement between outwardly extending lugs $107_1$ and $108_1$ on each brake ring respectively which engage in slots $104_1$ formed in lugs carried by the wall 104 of the axle housing the slots extending parallel to the axle 101. Two operating rings 107 and 108 are disposed side by side between the brake rings, the sides of the rings facing one another having the ramp recesses spaced circumferentially therearound oppositely disposed pairs of ramps each accommodating a ball 111. The operating rings are each mounted so as to be movable towards or away from one another by the co-operating balls and ramps and upon relative angular displacement between the operating rings. The operating ring 109 has outwardly extending lugs $109_1$ each of which engages in one of the aforementioned slots $104_1$ so that the operating ring 109 is held against angular displacement. The operating ring 110 is rotatably supported on a ring of balls 112 ball tracks being formed on the operating ring and the brake ring 108 the balls 112 being radially inwards in relation to the balls 111. The operating ring 110 has an outwardly projecting lug $110_1$ one end of a pull rod 114 being coupled to the lug by a pin 113. The pull rod extends substantially tangentially to the operating ring and has a threaded end portion which extends outwardly of the axle housing through an aperture. A sleeve 115 is screwed onto the outwardly projecting end of the pull rod, the sleeve also having one end of a brake rod 116 screwed therein the brake rod forming part of the vehicle brake linkage. A locknut 117 secures the sleeve 115. A washer 118 provides an abutment for the adjacent end of sleeve 115 to limit the movement of the pull rod 114 inwardly of the housing and determine the angular position of the operating ring 110 in the brake off position. The sleeve 115 advantageously has threads of opposite hand so that the sleeve can form a manually operable brake adjuster as previously described in connection with FIG. 5.

When the brake rod is operated to effect a braking operation, the pull rod 114 moves to the left (FIG. 8) and the operating ring 110 turns in the anti-clockwise direction (FIG. 8) relative to the operating ring 109. Thus the operating rings move away from one another under the action of the balls 111 and ramps, this movement being transmitted to the brake plates 102, 103 through the brake rings 107, 108 whereby the friction linings engage the stationary annular braking surfaces of the axle housing. Pull-off springs 106 effect return movement of the parts when the brake is released.

Figure 9:
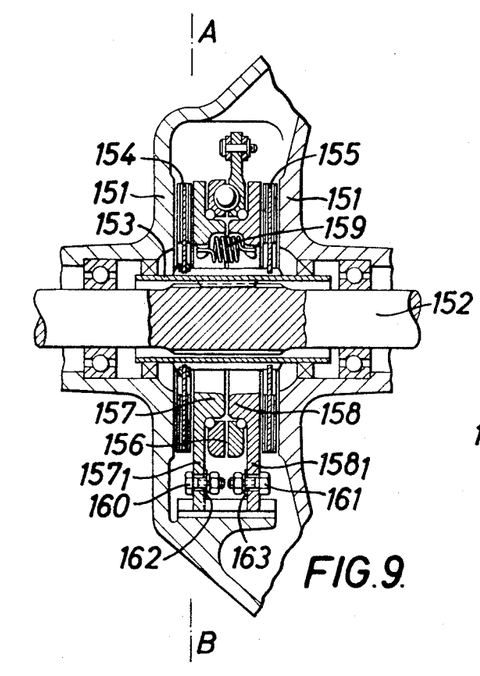
FIG. 9 is a view of a brake according to a fourth embodiment, the view being on the line C–D in FIG. 10.
Figure 10:
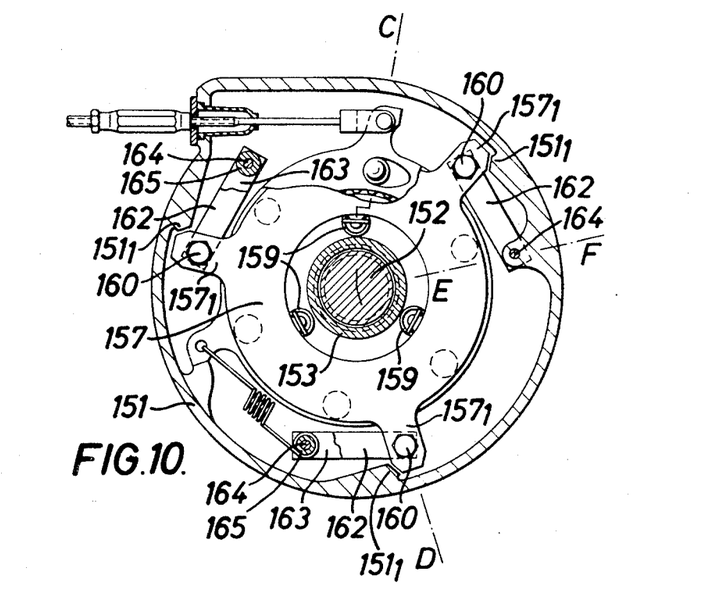
FIG. 10 is a view on the line A–B in FIG. 9.
Figure 11:
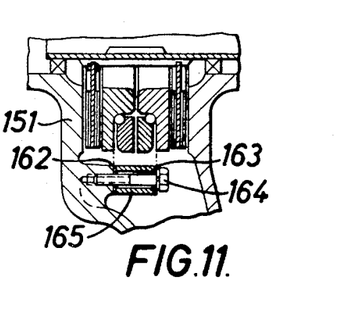
FIG. 11 is a section on the line E–F in FIG. 10, FIGS. 12 and 13 show a further brake construction, FIG. 12 being a section on the line C–D in FIG. 13 and FIG. 13 a section on the line A–B in FIG. 12.

In the embodiment of FIGS. 9, 10 and 11 the brake mechanism is disposed in an axle housing having oppositely disposed walls 151, each of which provide a stationary member, the internal faces of the said walls each being formed to provide an annular braking surface. An axle 152 extends through the housing the axle being rotatably supported on bearings. The axle has external splines engageable with the internal splines of a sleeve 153, which supports two annular brake plates 154, 155, internal splines of the brake plates engaging the external splines of the sleeve so that the brake plates are rotatable jointly with the axle and sleeve and slidable towards or away from one another on the sleeve. The brake plates 154, 155 each have annular friction linings on their opposite sides. Disposed between the brake plates are two L section brake rings 157, 158 which are mounted so as to be movable towards or away from one another but secured against circumferential movement by means hereafter described. The brake is operated as previously described by ball and ramp mechanism indicated generally by reference 156 this mechanism being actuated mechanically.

The present embodiment is concerned primarily with the means for securing the brake rings against circumferential movement. The brake ring 157 has three outwardly projecting lugs $157_1$ equally angularly spaced therearound. Each lug $157_1$ has one end of a strap 162 of resilient material such as spring steel, secured thereto by a bolt 160. The straps each extend substantially tangential to the brake ring the other end of each strap being secured by a bolt 164 to the axle housing. The wall of the axle housing is also provided with three projections $151_1$ each of which provides an abutment for the adjacent lug $157_1$. The other brake ring $158_1$ is similarly secured against circumferential movement, the straps for which are each indicated by reference numeral 163, and the lugs on the brake ring by reference numeral $158_1$. FIG. 11 shows the arrangement for securing the strap ends to the axle housing. The ends of each pair of straps to be secured to the axle housing have a sleeve 165 disposed therebetween a bolt 164 passing through the sleeve being screwed into a tapped hole in one of the walls 151 of the axle housing.

The straps 162, 163 and the projections $151_1$ are arranged so that the straps restrain the brake rings against circumferential movement in the principal direction of rotation i.e., the anti-clockwise direction in FIG. 10, the projections $151_1$ restraining such movement in the clockwise direction. A small clearance is provided between the adjacent faces of each projection $151_1$ and the lugs on the brake rings thus utilizing the advantage of the straps in the principal direction of rotation.

Figures 12, 14, 15:
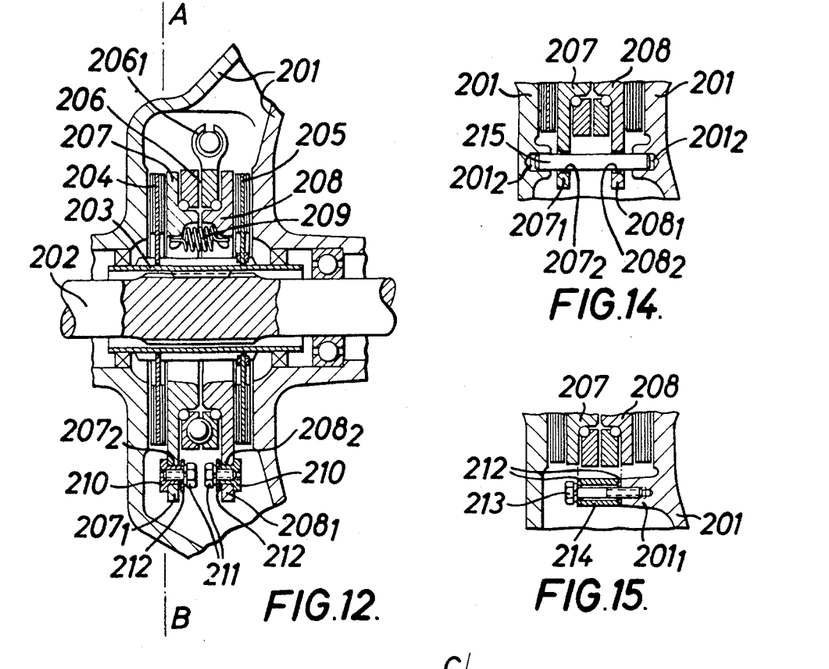
Figure 13:
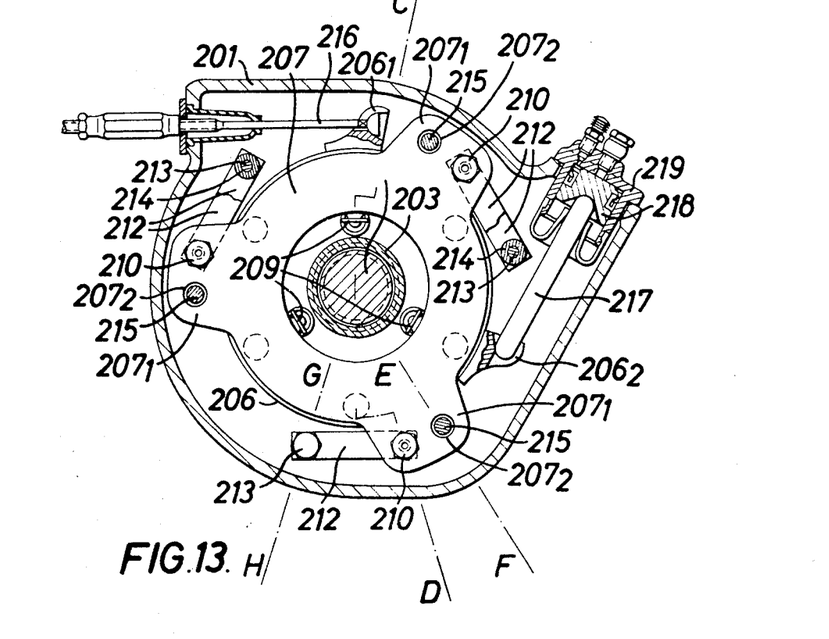

FIGS. 12 to 15 of the drawings show a brake according to another embodiment. The brake mechanism is disposed between opposite walls 201 of an axle housing the interior surface of each said wall being formed to provide an annular braking surface the walls each forming a stationary member. An axle 202 extends through the housing the axle having external splines engageable by internal splines of a sleeve 203 mounted on the axle. The sleeve 203 also has external splines engageable by internal splines of two annular brake plates 204, 205 the brake plates thus being rotatable jointly with the sleeve and axle and also slidable towards or away from one another on the sleeve. Each brake plate has a brake lining of friction material on opposite sides thereof. Disposed between the brake plates are two L section brake rings 207, 208 the brake rings being arranged with their stepped sides facing one another. The brake rings are mounted so as to be capable of movement towards or away from one another but are retained against circumferential movement. The means for retaining the brake plates against circumferential movement is identical for both plates and will be described fully for brake plate 207. Brake plate 207 has three outwardly extending lugs $207_1$ to each of which one end of a strap 212 is secured by a bolt 211 screwed into the threaded bore of a bush 210 located in a hole 207₂ in each lug. Each strap extends substantially tangentially to the brake ring and has its other end secured to the axle housing as later described. Each lug 207 has a second hole 207₂ spaced circumferentially from the first mentioned hole 207₂ a pin 215 extending through the hole and being supported at its opposite ends in holes 201₂ provided in the opposite walls 201 of the axle housing as shown in FIG. 14. The diameter of the pin 215 is smaller than the hole 207₂ to provide clearance between the pin and hole. The brake ring 208 is similarly mounted the lugs being indicated by reference 208₁, the straps by reference numeral 212, the threaded bushes in the lugs by reference 210. Each pin 215 passes through oppositely disposed holes 207₂ and 208₂ of the respective brake rings.

FIG. 15 shows the means for securing the strap ends to the axle housing. As shown each pair of oppositely disposed straps are maintained in spaced relationship by a spacing sleeve 214 a bolt 213 passing through the sleeve being screwed into a tapped hole in a boss 201₁ extending inwardly from the inner face of one of the walls 201 of the axle housing.

The brake rings and brake plates are moved away from one another to effect a braking operation by a ball and ramp mechanism disposed between the brake rings the ball and ramp mechanism being as previously described and indicated generally in FIG. 12 by reference 206. One of the operating rings, the ring on the right in FIG. 12, is operable by mechanical means the other operating ring being operable by fluid pressure operated means. The mechanical means is as previously described and consists of a pull rod 216 one end of which has a ball engaged in a recess in a lug 206₁ of the appropriate ring. The pull rod is coupled to a brake rod of the brake linkage by a threaded sleeve which can operate as a manual brake adjuster as previously described. The other operating ring is actuated by displacement of a piston 218 in a cylinder 219 carried by the axle housing the cylinder being connectable to a fluid pressure system on the vehicle. The piston is coupled by a tappet 217 to a lug 206₂ on the appropriate operating ring.

I claim:

1. A brake assembly comprising a shaft to be braked, a pair of spaced brake plates slidably mounted on the said shaft for rotation therewith, a braking surface about the shaft and substantially parallel to and in face to face relation with each plate, each of said plates having a friction surface facing the adjacent braking surface, means disposed between the said brake plates for moving them against said braking surface comprising a pair of annular brake rings having an L-shaped cross-section disposed about the shaft, a pair of annular operating rings disposed in face to face relationship within the resulting cavity between said L-shaped rings, spaced complementary sloping surfaces on said faces of the operating rings forming ramps therebetween, a ball disposed in each ramp, bearings rotatably supporting the operating rings on the said brake rings, said brake rings being fixed against circumferential movement but axially movable towards or away from each other, said operating rings being movable axially towards or away from each other and for angular movement relative to one another, and means for moving said operating rings relative to one another.

2. A brake assembly comprising brake plates, a lining of friction material on at least one side of each brake plate, said brake plates being adapted for mounting side by side on a shaft to be braked and to be rotatable jointly with said shaft and slidable axially thereon towards and away from one another and from two stationary braking surfaces parallel to the plane of the said plates and disposed one on either side of the brake plates, means for operating the brake plates disposed therebetween and comprising two brake rings arranged side by side and a ball and ramp mechanism disposed between the two brake rings, said mechanism comprising two operating rings arranged side by side, said operating rings having opposite faces with complementary ramps circumferentially spaced therearound, rolling elements between the operating rings for cooperating with the ramps, said operating rings being rotatably supported by bearings disposed between each operating ring and the associated brake ring and arranged radially inwardly of the said rolling elements, said brake rings being mounted so as to be movable axially towards or away from one another, but fixed against circumferential movement, the operating rings being mounted to be movable axially towards or away from one another and also capable of angular movement relative to one another by operation of brake actuating means, said relative angular movement as a result of operation of the brake actuating means to effect braking resulting in axial movement of the operating rings in opposite directions by the rolling elements and ramps, each operating ring during such movement contacting an adjacent brake ring, each operating ring and the associated brake ring moving jointly in the same direction to cause each said brake ring to engage an adjacent brake plate and move the same into contact with the appropriate stationary braking surface to effect braking.

3. A brake assembly comprising brake plates each having linings of friction material at least on one side thereof, said brake plates being adapted for mounting side by side on a shaft to be braked and to be rotatable jointly with said shaft and slidable axially thereof towards and away from one another and from two stationary members, each providing a braking surface parallel to the plane of the plates and disposed one on either side of the brake plates, brake plate operating means disposed between the brake plates and comprising two brake rings arranged side by side and a ball and ramp mechanism disposed between the two brake rings, said mechanism comprising two operating rings arranged side by side, the opposite faces of the operating rings each having complementary ramps circumferentially spaced therearound and rolling elements between the operating rings for cooperation with the ramps, said operating rings being rotatably supported by bearings disposed between each operating ring and the associated brake ring and arranged radially inwardly of the said rolling elements, the brake rings being mounted so as to be movable axially towards or away from one another but fixed against circumferential movement, the operating rings being mounted so as to be movable axially towards or away from one another and also capable of angular movement relative to one another by operation of brake actuating means comprising a first link pivoted to one operating ring and a second link pivoted to the other operating ring, both links being connected to a common pull rod, said relative angular movement as a result of operation of the said pull rod and the two links resulting in axial movement of the operating rings in opposite directions by the rolling elements and ramps, each operating ring during such movement contacting an adjacent brake ring, each operating ring and the associated brake ring moving jointly in the same direction to cause each said brake rings to engage an adjacent brake plate and move the same into contact with the appropriate stationary braking surface to effect braking.

4. A brake assembly comprising annular brake plates each having linings of friction material at least on one side thereof, said brake plates being adapted for mounting side by side on an axle to be braked and so as to be rotatable jointly with said axle and slidable axially thereof towards and away from two stationary members, each providing a braking surface parallel to the plane of the brake plates and disposed one on either side of the brake plates, means for operating the brake plates disposed between the brake plates and comprising two brake rings arranged side by side and a ball and ramp mechanism disposed between the two brake rings, said mechanism comprising two operating rings arranged side by side, the opposite faces of the operating rings each having complementary ramps circumferentially spaced therearound and rolling elements between the operating rings for cooperation with the ramps, one of the operating rings being fixed against angular displacement while the other of the operating rings has annular ball tracks formed therein for a ring of balls disposed between the operating ring and the associated brake rings and arranged radially inwardly of the said rolling elements and rotatably supporting said operating ring, the brake rings being mounted to be movable axially towards or away from one another, but fixed against circumferential movement, the operating rings being mounted so as to be movable axially towards or away from one another following an angular movement of the said rotatably supported operating ring by operation of brake actuating means comprising a mechanically operated brake rod attached to a pull rod pivoted to the said rotatably supported operating ring, said angular movement as a result of operation of the brake rod to effect braking resulting in axial movement of the operating rings in opposite directions by the rolling elements and ramps, each operating ring during such movement contacting an adjacent brake ring, each operating ring and the associated brake ring moving jointly in the same direction to cause each said brake ring to engage an adjacent brake plate and move the same into contact with the appropriate stationary braking surface to effect braking.

5. A brake assembly comprising annular brake plates each having linings of friction material at least on one side thereof, said brake plates being adapted for mounting side by side on an axle to be braked and to be rotatable jointly with said axle and slidable axially thereon towards and away from two stationary members each providing a braking surface parallel to the plane of the plates and disposed one on either side of the brake plates, means for operating the brake plates disposed therebetween and comprising two brake rings arranged side by side and a ball and ramp mechanism disposed between the two brake rings, said mechanism comprising two operating rings arranged side by side, the opposite faces of the operating rings each having complementary ramps circumferentially spaced therearound and rolling elements between the operating rings for cooperation with the ramps, said operating rings being rotatably supported by bearings disposed between each operating ring and the associated of the brake rings and arranged radially inwardly of the said rolling elements, the brake rings being mounted to be movable axially towards or away from one another but fixed against circumferential movement by equally angularly spaced lugs projecting outwardly each being provided with a tangential extending strap of resilient material secured to a stationary member, the operating rings being mounted to be movable axially towards or away from one another and also capable of angular movement relative to one another by operation of brake actuating means, said relative angular movement as a result of operation of the brake actuating means to effect braking resulting in axial movement of the operating rings in opposite directions by the rolling elements and ramps, each operating ring during such movement contacting an adjacent brake ring, each operating ring and the associated brake ring moving jointly in the same direction to cause each said brake ring to engage an adjacent brake plate and move the same into contact with the appropriate stationary braking surface to effect braking.

6. A brake assembly according to claim 5 wherein the said straps are arranged for being operative in the principal operation direction of rotation of the axle, while each of the brake rings is provided with abutments engageable with stationary parts of the brake assembly cooperating in the opposite direction of rotation.

7. A brake assembly comprising annular brake plates each having linings of friction material at least on one side thereof, said brake plates being adapted for mounting side by side on an axle to be braked and to be rotatable jointly with said axle and slidable axially thereon towards and away from two stationary members, each providing a braking surface parallel to the plane of the plates and disposed one on either side of the brake plates, means for operating the brake plates disposed between the brake plates and comprising two brake rings arranged side by side and a ball and ramp mechanism disposed between the two brake rings, said mechanism comprising two operating rings arranged side by side, the opposite faces of the operating rings each having complementary ramps circumferentially spaced therearound and rolling elements between the operating rings for cooperation with the ramps, said operating rings being rotatably supported by bearings disposed between each operating ring and the associated brake rings and arranged radially inwardly of the said rolling elements, the brake rings being mounted so as to be movable axially towards or away from one another, but fixed against circumferential movement, the operating rings being mounted so as to be movable axially towards or away from one another and also capable of angular movement relative to one another by operation of brake actuating means comprising a mechanically operated brake rod attached to a pull rod pivoted to one operating ring and a fluid pressure means connected by a movable tappet to the other operating ring, said relative angular movement as a result of operation of the said brake rod and the said fluid pressure means resulting in axial movement of the operating rings in opposite directions by the rolling elements and ramps each operating ring during such movement contacting an adjacent brake ring, each operating ring and the associated brake ring moving jointly in the same direction to cause each said brake ring to engage an adjacent brake plate and move the same into contact with the appropriate stationary braking surface to effect braking.

8. A brake assembly according to claim 7 comprising a manually operable adjusting means incorporated in a mechanically operated brake actuating means of one of the operating rings.

9. A brake assembly according to claim 7, comprising an automatically operable brake adjusting means incorporated in a fluid pressure operated means of one of the operating rings.

* * * * *